Sept. 14, 1943.   C. A. F. MEYER   2,329,286
HOSE REINFORCEMENT INSERTING APPARATUS
Filed Feb. 24, 1940
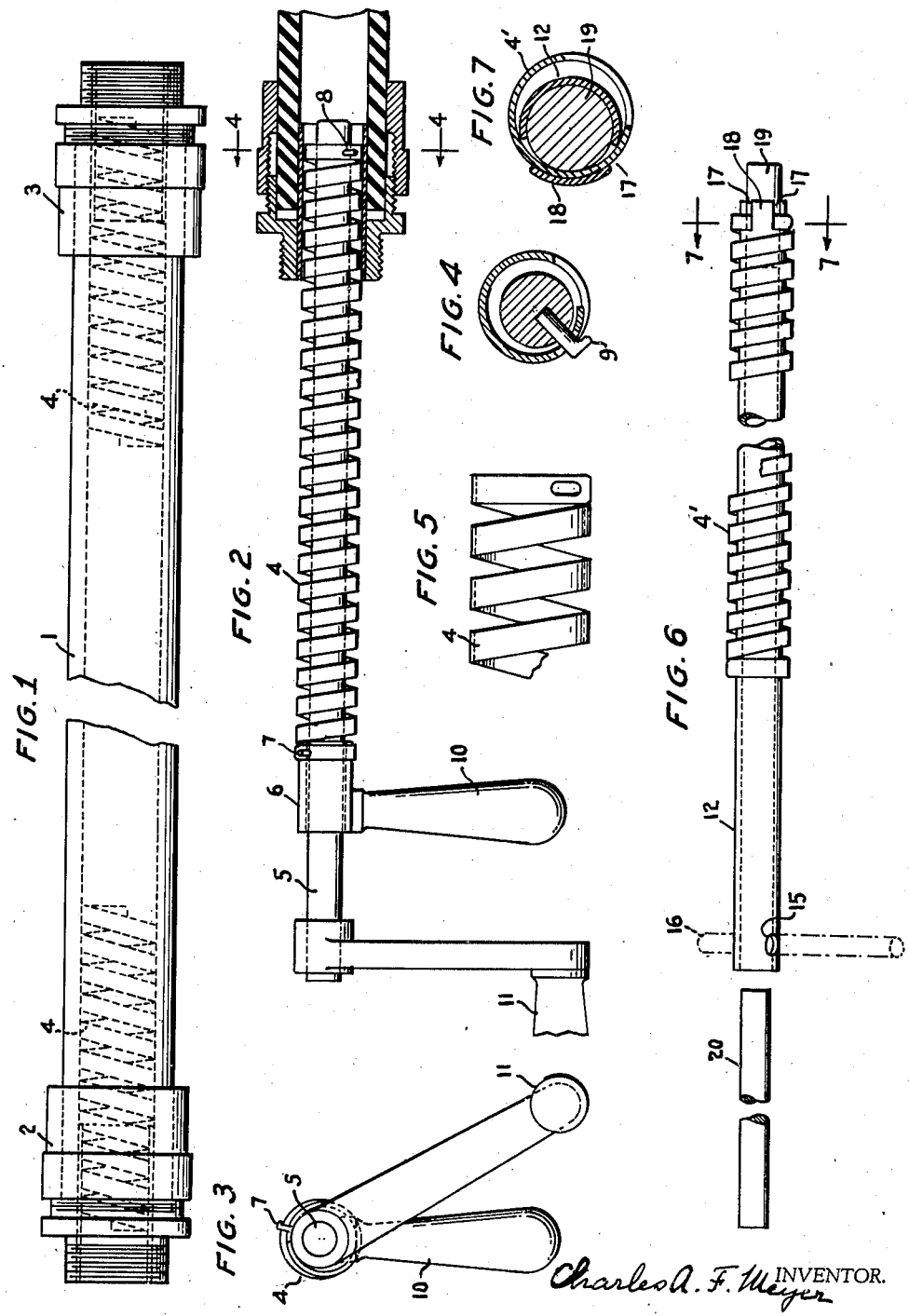

Patented Sept. 14, 1943

2,329,286

UNITED STATES PATENT OFFICE 2,329,286

HOSE REINFORCEMENT INSERTING APPARATUS

Charles A. F. Meyer, New York, N. Y.

Application February 24, 1940, Serial No. 320,714

3 Claims. (Cl. 29—87.1)

This invention relates to apparatus for contracting and inserting hose reinforcement.

It is of advantage to reinforce a hose, especially a soft rubber hose, against sharp bends or collapse at selected points by locating at each of such points a resilient helix of normally greater diameter than the diameter of the bore of the hose conduit. The expansive force of such a helix causes it to press strongly against the inner wall of the hose conduit whereby the hose is firmly supported and the frictional engagement of the helix with the conduit wall serves to hold the helix at the desired position longitudinally of the conduit.

To assemble such a helix with the hose the diameter of the helix may be constricted so that it is less than the internal diameter of the hose conduit so that it may be readily inserted within such conduit, the helix being held in this contracted condition while it is being inserted into the hose conduit, and after the helix has been placed in the desired position within the conduit it is allowed to expand under its resilience so as to tightly grip the inner wall of the hose.

It is the main object of the present invention to provide an apparatus whereby the diameter of the helix may be contracted as described and will hold the helix in the contracted condition while it is being inserted into the hose but which may then be released from the helix and withdrawn from the hose, leaving the helix assembled at its proper position longitudinally of the hose as above referred to.

Other and ancillary objects of the invention will appear hereinafter.

In the accompanying drawing which illustrates the invention:

Fig. 1 is a side elevation, partly broken away, of a hose having reinforcing helices assembled therewith;

Fig. 2 is a side elevation of apparatus for contracting and holding a helix to a reduced diameter, such figure showing the manner of insertion of the helix within the hose conduit, the end of the rubber hose and the coupling thereon being shown in section;

Fig. 3 is an end elevation, from the left hand side of the apparatus of Fig. 2;

Fig. 4 is a section on the line 4—4 of Fig. 2, the coupling and hose being omitted;

Fig. 5 is a fragmentary view showing, on an enlarged scale, an end of the helix;

Fig. 6 is a side elevation, partly broken away, of a modified form of helix contracting and holding apparatus; and Fig. 7 is a section on the line 7—7 of Fig. 6.

Referring first to Figs. 1 to 5 inclusive, the soft rubber hose 1 has the couplings 2 and 3 at each end and extending partially within each coupling and partially into the hose at each end is a reinforcing helix 4 formed of a coiled resilient strip, preferably steel, which helix tends to have a greater diameter than the inner wall of the hose conduit so that the resilience of the helix causes it to press firmly outwardly against the inner wall of the hose conduit to firmly support the same against collapsing and also causes engagement of the helix with the hose whereby it is held in its desired position longitudinally of the hose.

Such a reinforcing helix, it will be observed, is shorter than the hose and may be placed at any desired points longitudinally of the hose where it its desired to effect reinforcement. A soft rubber hose is especially liable to bend sharply and collapse, or even be cut, adjacent a coupling. In the structure shown, therefore, the reinforcing helices are located partially within the coupling and partially within the hose outside the coupling so that the soft rubber hose is reinforced and prevented from sharp bends or collapse or cutting at this point.

The helix being normally of a greater diameter than that of the bore of the hose conduit, in order to insert the helix within the hose it is reduced to a diameter less than that of the internal wall of the hose conduit, and while in this condition is inserted within the conduit.

The apparatus whereby this reduction is diameter of the helix is effected and whereby it is held in said condition while being inserted within the hose to the desired position and then is released to spring outwardly against the inner wall of the hose, comprises a shaft 5 upon which is rotatable and slidable a sleeve 6. One end of the helical reinforcing coil 4 is secured to the sleeve 6 by means of a pin 7 fixed to the sleeve, and the other end of the coil is secured to the shaft 5 by means of a similar pin 8. Each of the pins 7 and 8 extends into a slot in the coil and has an enlargement 9 at one side of its outer end forming a head within which the edge of the strip is drawn during the coiling and diameter-reducing operation, so that the ends of the coil are prevented from slipping off the pins during this operation. The coiled spring strip or helix 4 having thus been placed on the shaft 5 and secured to it and the sleeve 6, the sleeve 6 is held relatively stationary, by means of a handle 10 fixed to it, while the shaft 5 is rotated in the sleeve by means of a crank handle 11 fixed to the shaft. The direction of the rotation of the handle 11 is such as to cause a relative movement of the ends of the spring helix 4 so as to more tightly coil the helix and reduce its diameter. The relative turning of the ends of the helix having been carried out to a sufficient extent to effect the desired reduction in diameter of the helix, the helix is readily insertable within the hose conduit. The shaft 5 and the helix carried thereby are inserted through the coupling into the desired position within the conduit, the apparatus being meanwhile held in position to maintain the reduced diameter of the coil. The coil having been thus inserted into the desired position, the sleeve 6 and shaft 5 are then rotated in the opposite direction to that for effecting reduction in diameter of the helix. The coil then expands in diameter and comes firmly against the inner wall of the conduit and is firmly held in position. Further relative turning of the shaft 5 and sleeve 6, in the same direction, will insure release of the ends of the spring from the pins 7 and 8. When released from the pins its ends may spring outwardly against the conduit wall. The helix being thus released from the diameter-constricting and conduit-inserting apparatus, such apparatus may be withdrawn leaving the helix secured at the desired position within the conduit. The diameter-contracting and inserting apparatus may then be employed to operate upon and insert other helices.

In the modified reducing and inserting apparatus as shown in Figs. 6 and 7, the shaft 12 about which the resilient coiled strip helix 4' is wound, is a tube instead of being solid as is the case with the shaft 5 of Fig. 2. The tube 12 has holes 15 upon opposite sides through which the bar 16 extends and furnishes a means for turning the tubular shaft 12. The end of the tube has slits 17 whereby a tongue 18 is formed beneath which the end of the coil 4' is inserted, and such coil end is securely held to the shaft 12 by means of a tapered plug 19 driven into the end of the tube and wedging the coil end and the side of the tube together as shown clearly in Fig. 7. To release the coil end from the shaft 12, the plug 19 is driven out by a bar 20 inserted into the tube from the opposite end and driven against the end of the plug, the handle bar 16 being withdrawn from the tube to permit the bar 20 to be inserted. The other end of the coil 4' may be held by firmly gripping it by the hand of the operator.

One end of the helical resilient coil 4' being thus secured to the shaft 12 and the other end held stationary by the hand of the operator, the shaft is turned to constrict the diameter of the coil and the apparatus with the constricted coil is inserted into the hose conduit when the coil is released from the apparatus at its desired position in the conduit and the apparatus is assembled, in a manner similar to that described in connection with Figs. 1 to 5 inclusive.

While the invention has been illustrated in what are considered its best applications, it may have other embodiments without departing from its spirit and is not therefore limited to the structures shown in the drawing.

What I claim is:

1. An apparatus for contracting and inserting coiled spring reinforcements into the normal bore of a hose and comprising a pair of members, one extending through the other, the latter having a slotted end forming a tongue cooperating with a tapered plug for detachably securing one end of a coiled spring thereto.

2. An apparatus for contracting and inserting coil spring reinforcements into the normal bore of a hose and comprising a pair of members, one extending crosswise through the other, the latter having a slotted end forming a tongue cooperating with a tapered plug for detachably securing one end of a coil spring thereto.

3. An appliance for changing the diameter of a coil spring for insertion into a hose and comprising a support for said spring, said support comprising a tubular shaft positioned axially of said spring, means for securing one end of said spring to the shaft and comprising a slotted tongue formed portion at the end of the shaft and a tapered plug for detachably securing one end of the coil spring to said shaft, and removable means extending transversely of the shaft for rotating said shaft in a direction to contract said spring towards its axis.

CHARLES A. F. MEYER.